United States Patent Office 3,541,060
Patented Nov. 17, 1970

3,541,060
ACCELERATING VULCANIZATION WITH
BENZOTHIAZOLE-2-SULFINAMIDES
Alan Jeffrey Neale and Terence James Rawlings, Llangollen, Wales, assignors to Monsanto Chemicals Limited, London, England, a British company
No Drawing. Original application June 1, 1967, Ser. No. 642,717, now Patent No. 3,454,590, dated July 8, 1969. Divided and this application Dec. 18, 1968, Ser. No. 784,897
Int. Cl. C08f 27/06; C07d 91/44
U.S. Cl. 260—79.5                      6 Claims

ABSTRACT OF THE DISCLOSURE

Vulcanization accelerators are benzothiazole-2-sulfinamides of the formula

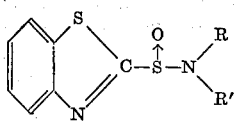

where R and R' are each an aliphatic or cycloaliphatic group of 2–20 carbon atoms or R and R' are linked to form a saturated cyclic system with the nitrogen atom.

BACKGROUND OF THE INVENTION

This application is a division of application Ser. No. 642,717 filed June 1, 1967, now U.S. Pat. 3,454,590.

The invention pertains to new compounds useful as vulcanization accelerators for rubber and processes for making the compounds. The applicable U.S. patent classifications are 260–306.6 and 260–779.

The compounds of this invention are delayed-action accelerators, i.e., an increase in scorch time is shown in vulcanizing rubber and using the compounds of this invention. Mingasson's U.S. Pat. 2,585,155 (Cl. 260–306.6) 1952, assigned to Societe Anonyme de Matieres Colorantes et Produits Chimiques Francolor, Paris, France, a French company, discloses N,N-dimethylbenzothiazole-2-sulfinamide as a vulcanization accelerator. The benzothiazole-2-sulfinamides of this invention show greater degree of delayed action than N,N-dimethylbenzothiazole-2-sulfinamide.

SUMMARY OF THE INVENTION

This invention relates to compounds that are useful as vulcanization accelerators and to processes for their production.

The compounds are benzothiazole-2-sulfinamides, and according to the present invention such a compound can be produced by the action on the corresponding benzothiazole-2-sulfenamide of an aqueous solution of an alkali metal hypohalite containing at least one mole of hypohalite per mole of sulfenamide.

The process is particularly valuable for the production of benzothiazole-2-sulfinamides in which the sulfinamide grouping is represented by the formula:

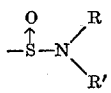

where R and R' are each an aliphatic or cycloaliphatic group or where R and R' are linked to form a saturated cyclic system with the nitrogen atom.

New compounds that can be produced by the process are benzothiazole-2-sulfinamides where R and R' in the above formula each represent an aliphatic or cycloaliphatic group and the total number of carbon atoms in R and R' is at least four, and sulfinamides where R and R' are linked to form a saturated cyclic system with the nitrogen atom.

The invention includes a process in which a new compound as defined above is employed as an accelerator for the vulcanization of rubber.

Sulfinamides that can be produced by oxidation of the corresponding sulfenamides in the process defined above can also be obtained by reaction of a benzothiazole-2-sulfinyl halide with an appropriate amine. In particular, sulfinamides in which the sulfinamide grouping is represented by the formula:

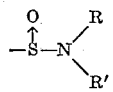

can be obtained by reaction of the sulfinyl halide with an amine having the formula HNRR'. This process for the production of a benzothiazole-2-sulfinamide comprises the reaction of a benzothiazole sulfinyl halide with ammonia or an amine. The compound 2-morpholino-sulfinylbenzothiazole prepared by this process is a useful accelerator. The compound is claimed in the copending application of Robert H. Campbell and Alfred B. Sullivan, Ser. No. 642,712, filed June 1, 1967.

The oxidation process of the invention can be applied to the production of benzothiazole-2-sulfinamide itself and also to the production of sulfinamides in which the nitrogen atom carries a single substituent, for example N-alkyl and N-cycloalkyl benzothiazole-2-sulfinamides. In the sulfinamides where the nitrogen atom is doubly substituted as shown in the above formula, the aliphatic groups from which R and R' can be selected include alkyl groups, generally those containing from 1 to 20 carbon atoms having either straight or branched chains, and more especially alkyl groups containing from 2 to 12 carbon atoms, for example ethyl, isopropyl, sec.-butyl, n-amyl, hexyl, octyl, nonyl, and dodecyl groups. R and R' may also be selected from substituted alkyl groups, for example halogen, cyano, or aryl-substituted alkyl groups such as for instance cyanoethyl and benzyl.

Where a group R and R' is cycloaliphatic, it is usually one containing from 5 to 7 carbon atoms in the ring. The preferred groups are cycloalkyl and alkylcycloalkyl groups, for example cyclopentyl, cyclohexyl, or methylcyclohexyl, although substituents, as exemplified above for instance, may be present.

Instances of benzothiazole sulfinamides where R and R' are linked and form a saturated cyclic system with the nitrogen atom, are those in which —NRR' represents a piperidino or substituted piperidino group, or a hexamethyleneimino group.

The benzothiazole-2-sulfinamides that can be produced by the process of the invention include, moreover, members where the benzene nucleus carries one or more substituents. Such a substituent can be, for example a halogen atom, especially chlorine or bromine, a nitro group, an alkyl group, or an alkoxy group.

DESCRIPTION OF THE PREFERRED EMBODIMENTS

Specific examples of benzothiazole-2-sulfinamides that can be obtained by the process of the invention are:

N-methyl-N-cyclohexyl benzothiazole-2-sulfinamide
N,N-diisopropyl benzothiazole-2-sulfinamide
N,N-diisobutyl benzothiazole-2-sulfinamide
N,N-dicyclohexyl benzothiazole-2-sulfinamide
2-hexamethyleneiminosulfinylbenzothiazole
N,N-diisopropyl-6-chlorobenzothiazole-2-sulfinamide, and
N,N-dicyclohexyl-6-ethoxybenzothiazole-2-sulfinamide.

In practice, the oxidation process of this invention is usually conducted by adding the aqueous solution of alkali metal hypohalite to a dispersion or solution of the benzothiazole sulfenamide in an inert liquid dispersion or solvent medium. This can be water but is preferably a water-miscible organic solvent. Water-miscible solvents that can be used include alcohols, ketones, glycols and dioxane, the alcohols, especially methanol, being generally preferred.

Preferred reaction temperatures for the oxidation are within the range 30° to 80° C. The optimum depends on the particular benzothiazole-2-sulfenamide that is oxidized, but is often within the range 35° to 50° C. When using methanol as the water-miscible solvent, it is sometimes convenient to conduct the process under reflux at the boiling point.

The hypohalite is employed in at least the stoichiometric quantity required for oxidation of the sulfenamide to the sulfinamide, but not usually in amounts exceeding three times this quantity. Good results are obtained using from 1.5 to 2.5 moles of hypohalite per mole of sulfenamide. Sodium hypochlorite is the alkali metal hypohalite normally employed in practice, although hypochlorites of other alkali metals, for instance potassium and lithium, and the alkali metal salts of other hypohalous acids, for instance hypobromous acid, are functionally satisfactory. The commercial aqueous solution of sodium hypochlorite containing nominally about 15% by weight NaOCl (in practice usually from 12 to 16% by weight) is quite suitable and is in fact preferred to more dilute solutions.

The benzothiazole-2-sulfinyl halides, which have not hitherto been described and are useful in the second process of the benzothiazole-2-sulfinamides of this invention, can be obtained by the reaction of a thionyl halide with an alkyl benzothiazole-2-sulfinate. Benzothiazole-2-sulfinyl chlorides, for example, are obtained in high yield by the action of thionyl chloride on lower alkyl benzothiazole-2-sulfinates, particularly methyl benzothiazole-2-sulfinates.

For the conversion of the benzothiazole sulfinyl halide to the required benzothiazole sulfinamide, it is convenient to use a sufficient excess of ammonia or the amine for the excess base to function as a hydrogen-halide acceptor. The reaction proceeds at ordinary atmospheric temperatures, for example from 5° to 25° C., although somewhat higher temperatures, for example up to 60° C. can be used if desired. While an inert diluent may facilitate the reaction and the isolation of the product, its presence is not essential. Inert diluents that can be used include hydrocarbons, particularly aromatic hydrocarbons such as for instance benzene, and halogenated hydrocarbons.

The new compounds can be used as accelerators in the vulcanization of natural and synthetic sulfur-vulcanizable rubbers. Synthetic rubbers that can be vulcanized include polymers of 1,3-butadienes, for instance of 1,3-butadiene itself and of isoprene, copolymers of 1,3-butadienes with other monomers, such as styrene, acrylonitrile, isobutylene, or methyl methacrylate, and polyolefin rubbers, for instance ethylene-propylene terpolymers.

In the vulcanization process, the accelerators are usually used in conjunction with sulfur or a sulfur-containing vulcanizing agent, for example an amine disulfide or thiuram sulfide, and with other commonly used ingredients, for example zinc oxide, stearic acid, a filler and an antioxidant.

The additives can be incorporated into unvulcanized rubber by conventional means, using for example an internal mixer or a roll mill, or by adding a solution or suspension to a rubber latex, giving a mixture which is subsequently vulcanized at an elevated temperature. This temperature is one that is appropriate to the particular rubber concerned, for example a temperature in the range 135°–155° C. where the composition is based on natural rubber, or a temperature in the range of 140°–160° C. where the composition is based on a styrene-butadiene rubber.

The amount of accelerator used depends on a number of factors, including for example the type of rubber and the use for which the vulcanized product is required. The amount is, however, usually within the range 0.3 to 5 parts by weight, and more especially within the range 0.3 to 2 parts by weight, per 100 parts by weight of rubber, for example 0.5, 1.0 and 1.5 parts by weight.

Conventional amounts of other additives referred to above can be used.

The invention is illustrated by the following examples:

EXAMPLE 1

This example describes the production of N,N-dicyclohexylbenzothiazole-2-sulfinamide by oxidation of N,N-dicyclohexylbenzothiazole-2-sulfenamide using sodium hypochlorite.

150 grams of a 15% by weight aqueous solution of sodium hypochlorite containing 0.3 mole of NaOCl were gradually added during a period of 10 minutes to a suspension of 48.3 grams (0.15 mole) of N,N-dicyclohexylbenzothiazole-2-sulfenamide in 300 ccs. of boiling methanol. Boiling was continued for one hour, and then the mixture was cooled to 0° C. By filtration, there were recovered 64 grams of a brown solid, most of which was extracted into benzene leaving 16 grams of insoluble material. The benzene solution was washed thoroughly with water and then dried using sodium sulfate. The benzene was removed at 50° C. in vacuo to give 40 grams of a brown oil which solidified on standing. Crystallization of this solid from ethanol gave 26 grams of unchanged N,N-dicyclohexylbenzothiazole-2-sulfenamide. The ethanolic mother liquors were evaporated giving a brown oil which on crystallization from 60–80 petroleum ether yielded 5.5 grams of N,N-dicyclohexylbenzothiazole-2-sulfinamide in the form of fawn crystals with a melting point between 135° and 137° C.

EXAMPLE 2

This example describes the production of N,N-dicyclohexylbenzothiazole-2-sulfinamide from benzothiazole-2-sulfinyl chloride and dicyclohexylamine.

2.9 grams (0.0135 mole) of methyl benzothiazole-2-sulfinate were added quickly to 1.6 grams (0.0135 mole) of freshly distilled thionyl chloride. After 30 minutes at room temperature, benzothiazole-2-sulfinyl chloride had formed as a homogeneous liquid, and was dissolved in 10 ccs. of dry benzene. This benzene solution was added gradually to a stirred, cooled solution of 12.2 grams (0.0675 mole) of dicyclohexylamine in 10 ccs. of dry benzene. After a further 10 minutes at room temperature the mixture was filtered, the filtrate was washed thoroughly with water and was then dried by standing over anhydrous sodium sulfate. The benzene was removed at 40° C. under reduced pressure leaving 8.9 grams of an oil which crystallized from 60–80 petroleum ether to give 1.8 grams of a solid having a melting point of 110°–127° C. Recrystallization from a mixture of petroleum ether and benzene using charcoal to decolorize the solution gave 0.6 gram of N,N-dicyclohexylbenzothiazole-2-sulfinamide as colorless crystals having a melting point of 135°–136.5° C.

EXAMPLE 3

This example describes the oxidation of N,N-di-isopropylbenzothiazole-2-sulfenamide to N,N - di-isopropylbenzothiazole-2-sulfinamide using sodium hypochlorite.

150 grams of a 15% by weight solution of sodium hypochlorite containing 0.25 mole of NaOCl were slowly added to a suspension of 39.6 grams (0.15 mole) of N,N-di-isopropylbenzothiazole-2-sulfenamide in 300 ccs. of methanol at 40°–45° C. The addition was completed in twenty minutes, external cooling being required to keep the temperature within the stated range. After a further ten minutes the product was cooled to 0° C. and extracted with benzene. By evaporation of the solvent from the benzene extracts, there were obtained 33 grams of an oil which was crystallized from petrol-benzene to give 6.5 grams of N,N-di-isopropylbenzothiazole-2-sulfinamide as a white solid with a melting point of 78°–80° C. ($C_{13}H_{18}N_2OS_2$ requires: C, 55.3; H, 6.42; N, 9.92; S, 22.7. Found: C, 55.2; H, 6.41; N, 10.7; S, 23.2%.)

EXAMPLE 4

This example describes the production of N,N-di-isopropylbenzothiazole-2-sulfinamide from benzothiazole-2-sulfinyl chloride and di-isopropylamine.

Benzothiazole-2-sulfinyl chloride was prepared by adding 2.9 grams (0.0135 mole) of methylbenzothiazole-2-sulfinate, to 1.6 grams (0.0135 mole) of freshly distilled thionyl chloride. After 30 minutes at room temperature a homogeneous liquid has been formed and this liquid, in 10 ccs. of dry benzene, was slowly added to a stirred, cooled solution of 6.82 grams (0.0675 mole) of di-isopropylamine in 10 ccs. of dry benzene. After a further ten minutes at room temperature the mixture was filtered. The filtrate was thoroughly washed with water, dried using sodium sulfate, and then evaporated at 40° C. in vacuo to give 4.9 grams of an oil. By crystallization of the oil from petrol-benzene, N,N-di-isopropylbenzothiazole-2-sulfinamide was obtained as a colorless crystalline solid having a melting point of 79°–81° C. Recrystallization raised the melting point to 82°–83.5° C. ($C_{13}H_{18}N_2OS_2$ requires: C, 55.3; H, 6.42; N, 9.92; S, 22.7. Found: C, 54.9; H, 6.18; N, 10.3; S, 23.4%.)

EXAMPLE 5

This example describes the production of 2-morpholinosulfinylbenzothiazole by the reaction of benzothiazole-2-sulfinyl chloride with morpholine.

Benzothiazole-2-sulfinyl chloride was first prepared by the rapid addition of 2 grams (0.0135 mole) of methylbenzothiazole-2-sulfinate to 1.6 grams (0.0135 mole) of freshly distilled thionyl chloride, allowing the mixture to stand at rom temperature for 16 hours, and then subjecting the reaction mixture to reduced pressure at 35° C. to remove methyl chlorosulfite.

5.8 grams (0.0675 mole) of morpholine were added to the residual solid. Gentle warming initiated the reaction which was then allowed to proceed at room temperature for three days. The reaction mixture was extracted with benzene, and the benzene extracts were washed thoroughly with water. After drying over sodium sulfate, the benzene was removed in vacuo to give 3.1 grams of a yellow oil which was then crystallized from ethanol to give 0.43 gram of 2-morpholinosulfinylbenzothiazole as colorless crystals having a melting point of 101° – 102° C. ($C_{11}H_{12}N_2O_2S_2$ requires: C, 49.2; H, 4.51; N, 10.4; S, 23.9%. Found: C, 49.0; H, 4.57; N, 10.4; S, 24.4%.)

EXAMPLE 6

This example describes the production of rubber vulcanizates using the compounds described in the previous examples as vulcanization accelerators, and includes for comparison results obtained using the corresponding sulfenamides and using N,N-dimethylbenzothiazole-2-sulfinamide A masterbatch of the following composition was prepared by compounding on a mill:

| | Parts by weight |
|---|---|
| Smoked sheets | 100 |
| Zinc oxide | 5 |
| Stearic acid | 3 |
| HAF carbon black | 50 |
| Process oil | 3 |
| Sulfur | 2.5 |

Each test compound was then incorporated into a separate portion of the masterbatch at a level equivalent to 0.5 part per 100 parts by weight of rubber. A second series of mixtures was prepared by incorporating each test compound into a separate portion of the masterbatch at a level equivalent to 1.0 part per 100 parts by weight of rubber. The mixtures were allowed to stand at room temperature for 24 hours befor being tested.

In one test method, a sample under test was placed in a Mooney plastometer fitted with a large rotor, according to British Standard Specification No. 1673. The time taken for the reading of the instrument to react 5 units above the minimum at a temperature of 121° C. was recorded as a measure of the scorch time, the higher this figure, the greater the degree of delayed action of the accelerator.

In a second test method, cure time and modular properties of the vulcanizate were measured using the Monsanto Oscillating Disk Rheometer described by Decker, Wise and Guerry in Rubber World, December 1962, page 68. Cure time was recorded as the time in minutes to reach 90% of the maximum cure, and the maximum torque in inch/pounds was recorded as a measure of the modulus.

A similar series of tests was carried out in styrene-butadiene rubber, using a masterbatch having the following composition:

| | Parts by weight |
|---|---|
| Styrene-butadiene rubber | 100 |
| Zinc Oxide | 4 |
| Stearic acid | 2 |
| Process oil | 8 |
| HAF carbon black | 50 |
| Sulfur | 2 |

The test compounds were incorporated at a level equivalent to 1.0 part by weight per 100 parts by weight of rubber. For these mixtures the Mooney plastometer was operated at a temperature 135° C. and the rheometer at a temperature of 153° C.

The results of the various tests described above are given in the table below:

| | Natural rubber | | | | | | Styrene-butadiene rubber | | |
|---|---|---|---|---|---|---|---|---|---|
| | Accelerator at 0.5 phr. | | | Accelerator at 1.0 phr. | | | | | |
| | Scorch | Cure | Modulus | Scorch | Cure | Modulus | Scorch | Cure | Modulus |
| N,N-diisopropyl-benzothiazole-2-sulfinamide | 38 | 42½ | 71½ | 31 | 32 | 82 | 45 | 50½ | 74 |
| N,N-diisopropyl-benzothiazole-2-sulfenamide | 33½ | 35 | 75½ | 30 | 27 | 86 | 50 | 44 | 77 |
| N,N-dimethyl-benzothiazole-2-sulfinamide | 26 | 33 | 72 | 23 | 25 | 85½ | 33 | 35½ | 71 |
| N,N-dicyclohexyl-benzothiazole-2-sulfinamide | 38½ | 42 | 68 | 34½ | 31½ | 79 | 53½ | 54 | 68 |
| N,N-dicyclohexyl-benzothiazole-2-sulfenamide | 34½ | 41½ | 71½ | 28¼ | 29 | 82 | 49 | 45 | 74 |

The results show the generally greater degree of delayed action of the benzothiazole sulfinamides of the invention in comparison with the corresponding sulfenamides and in comparison with N,N-dimethylbenzothiazole-2-sulfinamide. The figures for the cure rates and moduli of vulcanizates using the new accelerators represent high degrees of accelerator activity.

We claim:
1. A process for the vulcanization of a sulfur-vulcanizable rubber, in which an effective amount of a benzothiazole-2-sulfinamide is employed as a vulcanization accelerator of the formula

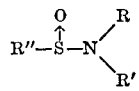

where

R and R' with the nitrogen are N-methyl-N-cyclohexylamino, N,N-diisopropylamino, N,N-diisobutylamino, N,N-dicyclohexylamino, or hexamethyleneimino and R" is 2-benzothiazolyl, 6-chloro-2-benzothiazolyl or 6-ethoxy 2-benzothiazolyl.

2. The process of claim 1 where R and R' with the nitrogen are N,N-diisopropylamino.
3. The process of claim 1 where R and R' with the nitrogen are N,N-dicyclohexylamino.
4. The process of claim 1 where R and R' with the nitrogen are N-methyl-N-cyclohexylamino.
5. The process of claim 1 where R and R' with the nitrogen are N,N-diisobutylamino.
6. The process of claim 1 where R and R' with the nitrogen are hexamethyleneimino.

References Cited

UNITED STATES PATENTS 2,585,155  2/1952  Mingasson _____ 260—79.5

JOSEPH L. SCHOFER, Primary Examiner

C. A. HENDERSON, Jr., Assistant Examiner

U.S. Cl. X.R.

260—306.6, 785, 786, 788

UNITED STATES PATENT OFFICE
CERTIFICATE OF CORRECTION

Patent No. 3,541,060                    Dated November 17, 1970

Inventor(s) Alan J. Neale and Terence Rawlings

It is certified that error appears in the above-identified patent and that said Letters Patent are hereby corrected as shown below:

In the heading, Column 1, line 10, after "784,897" add:

-- Claims priority, application Great Britain, June 17, 1966, 27,184/66 --

Signed and sealed this 25th day of May 1971.

(SEAL)
Attest:

EDWARD M. FLETCHER, JR.
Attesting Officer

WILLIAM E. SCHUYLER, JR
Commissioner of Patents